United States Patent
Pignier et al.

(10) Patent No.: US 10,176,940 B2
(45) Date of Patent: Jan. 8, 2019

(54) ELECTRICAL CABLE SECTION DETECTION CIRCUIT BREAKER AND METHOD OF CONTROLLING SUCH A CIRCUIT BREAKER

(71) Applicant: ELECTRICITE DE FRANCE, Paris (FR)

(72) Inventors: Daniel Pignier, Bourg la Reine (FR); David Menga, Verrieres le Buisson (FR)

(73) Assignee: Electricite de France, Paris (FR)

( * ) Notice: Subject to any disclaimer, the term of this patent is extended or adjusted under 35 U.S.C. 154(b) by 376 days.

(21) Appl. No.: 15/030,628

(22) PCT Filed: Oct. 16, 2014

(86) PCT No.: PCT/FR2014/052645
§ 371 (c)(1),
(2) Date: Apr. 20, 2016

(87) PCT Pub. No.: WO2015/059390
PCT Pub. Date: Apr. 30, 2015

(65) Prior Publication Data
US 2016/0276116 A1    Sep. 22, 2016

(30) Foreign Application Priority Data
Oct. 21, 2013    (FR) ..................................... 13 60253

(51) Int. Cl.
*H01H 9/54*    (2006.01)
*H01H 33/59*    (2006.01)
(Continued)

(52) U.S. Cl.
CPC .............. *H01H 9/54* (2013.01); *H01H 33/59* (2013.01); *H01H 47/002* (2013.01);
(Continued)

(58) Field of Classification Search
CPC ........ H01H 9/54; H01H 33/59; H01H 47/002; H01H 71/74; H01H 2300/03; H02H 1/0007; H02H 3/08; Y02B 90/224; Y04S 20/14
(Continued)

(56) References Cited

U.S. PATENT DOCUMENTS

2008/0204947 A1    8/2008  Shea et al.

FOREIGN PATENT DOCUMENTS

CN    102568939 A    7/2012
CN    202332743 U    7/2012
(Continued)

OTHER PUBLICATIONS

Machine translation of Harlan et al. European Patent Document EP 119187 A, dated Sep. 19, 1984.*

*Primary Examiner* — Kevin J Comber
(74) *Attorney, Agent, or Firm* — Drinker Biddle & Reath LLP

(57) ABSTRACT

A cable section detection circuit breaker and a method of control making it possible notably to automatically calibrate the circuit breaker according to the section detected. For this purpose, the circuit breaker, provided for the protection of at least one electrical line comprising at least one electrical cable, comprises: an electrical cable diameter sensor; and a data processing unit connected to the diameter sensor for receiving a value of said diameter. The processing unit is capable of verifying that the value of said diameter is greater than or equal to a limit value determined from an assigned current of said circuit breaker.

19 Claims, 4 Drawing Sheets

(51) Int. Cl.
 *H01H 47/00* (2006.01)
 *H01H 71/74* (2006.01)
 *H02H 1/00* (2006.01)
 *H02H 3/08* (2006.01)

(52) U.S. Cl.
 CPC .......... *H01H 71/74* (2013.01); *H02H 1/0007* (2013.01); *H02H 3/08* (2013.01); *H01H 2300/03* (2013.01); *Y02B 90/224* (2013.01); *Y04S 20/14* (2013.01)

(58) Field of Classification Search
 USPC .......................................................... 361/87
 See application file for complete search history.

(56) References Cited

FOREIGN PATENT DOCUMENTS

| EP | 0 119 187 A1 | 9/1984 |
|---|---|---|
| EP | 1 841 033 A1 | 10/2007 |

\* cited by examiner

ELECTRICAL CABLE SECTION DETECTION CIRCUIT BREAKER AND METHOD OF CONTROLLING SUCH A CIRCUIT BREAKER

CROSS-REFERENCE TO RELATED APPLICATIONS

This application is the U.S. national phase of the International Patent Application No. PCT/FR2014/052645 filed Oct. 16, 2014, which claims the benefit of French Application No. 13 60253 filed Oct. 21, 2013, the entire content of which is incorporated herein by reference.

FIELD

The invention relates to the field of electrical installations, and notably of electrical circuit breakers. The invention further provides a method of controlling electrical circuit breakers, in particular for performing a circuit breaker auto-calibration.

BACKGROUND

In the interests of energy efficiency and improving the safety of electrical installations, electrical management and monitoring units may be arranged within the installations, e.g. in apartments or industrial buildings.

These management units are generally directly installed on the electrical network of the installation and are used to implement services for managing electrical uses and warning in the event of a fault. Consumers can thus control their consumption and be warned of possible malfunctions.

Management units are often installed on the apartment's electrical panel (entry point of the power supply provided by the electrical energy supplier upstream of the panel). The units are then generally arranged for measuring the consumption on outgoing electrical cables from the panel which supply the network.

These outgoing electrical cables are usually associated with a circuit breaker intended to protect an electrical line of the network supplied by this outgoing cable. The management units may further be suitable for detecting a tripping of the circuit breaker notably in order to warn consumers of an electrical fault in their apartment.

However, when the calibration of the circuit breaker does not match the electrical properties of the line to be protected, the circuit breaker is liable not to provide adequate protection or to be tripped unexpectedly.

Whereas the management units are capable of detecting a circuit breaker operating anomaly, they are on the other hand not designed for warning of such an anomaly, e.g. during the installation of the circuit breakers in the panel.

SUMMARY

The present invention will improve the situation. The invention notably provides for verifying that the calibration of a circuit breaker matches the characteristics of a power line to be protected, and further for adjusting the calibration of the circuit breaker according to these characteristics.

For this purpose, a first aspect of the invention relates to a circuit breaker for the protection of at least one electrical line comprising at least one electrical cable. The circuit breaker provided comprises at least:

an electrical cable diameter sensor; and a data processing unit connected to the diameter sensor for receiving a value of the diameter.

Furthermore, the processing unit is capable of verifying that the value of the diameter is greater than or equal to a limit value determined from an assigned current of the circuit breaker.

Assigned current is understood to mean the maximum value of the current that the circuit breaker can support permanently (corresponding to the rating of the circuit breaker).

The detection of the diameter of the electrical cable can be used to evaluate the dimensioning of the cable and to determine whether the electrical properties of such a dimensioning are able to support the intensity of the assigned current.

This verification of the size of the diameter may notably be performed when the circuit breaker is installed by an operative. Thus, when the detected diameter of an electrical cable proves insufficient with respect to the size required for supporting a maximum current intensity relative to the rating of the circuit breaker (i.e. assigned current), a warning may be emitted for warning the operator that the characteristics of the cable and the circuit breaker do not match.

The warned operative may then modify the cable and/or the circuit breaker so that the electrical line is suitably protected once the circuit breaker is installed. Indeed with such a verification of the calibration of the circuit breaker with respect to the characteristics of the electrical line to be protected, an electrical installation including such a circuit breaker is safer.

It should be noted that measuring the diameter (which may be in millimeters, for example) can be used to determine the section of the electrical cable (typically in square millimeters) and indeed to determine the electrical characteristics of the cable (and more particularly the maximum current intensity that the cable can support without risk of malfunction).

In one particularly advantageous embodiment, the processing unit may further be capable of determining, according to the value of the diameter, at least a first threshold for tripping an electrical cut-out of the line to be protected.

In this way, the circuit breaker may be parameterized so as to adjust its tripping threshold according to the section of the associated electrical cable. This adjustment of the tripping threshold can be used particularly to avoid nuisance tripping usually caused when a circuit breaker is of an inadequate rating with respect to the dimensioning of the associated cable.

Tripping threshold is understood to mean a limit current from which the circuit breaker, when it is in an engaged state (circuit closed), changes to a tripped state (circuit open). This limit current may, for example, be reached during consumption peaks or an overvoltage inherent in a short circuit.

Advantageously, the circuit breaker may further comprise a current sensor suitable for measuring a current and a potential difference on the electrical line. The processing unit is further capable of collecting data from the current sensor and determining a second threshold for tripping an electrical cut-out according to the collected data and the diameter value of the cable.

In this embodiment, the tripping threshold of the circuit breaker may be adjusted according to the electrical consumption measured on the line associated with the circuit breaker, within the limit of the diameter of the cable.

The circuit breaker is hence automatically parameterized according to:

its rating;

the diameter of the associated cable or cables;

the electrical uses on the electrical line or lines to be protected.

The adjustment of the tripping threshold according to the section of the cable improves the tripping reactivity of the circuit breaker. This improved reactivity notably avoids any overheating usually caused (notably when there is a large electrical load) on the line to be protected when a circuit breaker is of an inappropriate rating with respect to the dimensioning of the cables. It should therefore be noted that the tripping latency is substantially reduced by the circuit breaker provided and improves the electrical protection of the line.

The adjustments of the tripping threshold of the circuit breaker thus enable the electrical safety provided by the circuit breaker to be adapted according to:

the configuration of the portion of the electrical network protected by the circuit breaker (dimensioning of the associated cable) and the equipment connected to this portion (measured consumption of electrical uses).

The tripping thresholds may notably be adjusted dynamically according to the measured electrical uses, within the limits imposed by the dimensioning of the cable associated with the circuit breaker.

Furthermore, installation errors may be detected, such as several cables inserted in the circuit breaker, each having a different section.

Advantageously, the circuit breaker may further comprise at least one memory suitable for archiving data collected from each of the sensors.

Thus, the measurements of diameter and consumption recorded by the sensors of the circuit breaker are preserved, notably for being communicated to the consumer, to an operative or to a remote computer entity. The stored measurements provide information on the consumption, installation or fault events that have occurred in the circuit breaker over specified periods. For this purpose, the measurement data from the sensors may be timestamped.

Advantageously, the circuit breaker may further comprise at least one communication interface, the processing unit being suitable for transmitting, on request, via the communication interface, the value of the diameter or data collected by the sensor or sensors.

According to this embodiment, the circuit breaker may transmit the measurement data from the sensors to a remote computer entity, for example, or to the consumer (typically via an application on a Smartphone). This communicated measurement data notably makes it possible to deploy services for monitoring faults and electrical consumption in an apartment. It is also noted that in being performed at the beginning of the electrical network (at the outgoing cables of the electrical panel), the consumption measurements carried out by the circuit breaker offer comprehensive electrical uses on the associated lines.

In addition, the processing unit may be capable of determining the at least one threshold for tripping an electrical cut-out of the line to be protected according to a calibration instruction received via the communication interface.

For example, consumers may wish to change the characteristics of their contract, notably by increasing the contracted power. The electrical energy supplier (or a management unit of an electrical panel including the circuit breaker) then sends a calibration instruction to the circuit breaker (in particular to the main circuit breaker of the electrical panel). Where appropriate, the tripping threshold may be increased, on condition that the threshold does not exceed the limits imposed by the dimensioning of the cable.

Thus, the characteristics of the power supply provided by the energy supplier may change, with auto-adaptation of the circuit breaker's calibration, without risking failure of the protection provided by the circuit breaker.

According to an advantageous embodiment, the circuit breaker may be engaged or tripped on receiving a control instruction received via the communication interface.

The control instruction may notably be sent by the consumers via an application provided for this purpose, for controlling their consumption remotely, for example, or responding to a warning received.

Advantageously, the circuit breaker may further comprise an electrical power supply unit controlled by the processing unit. The electrical power supply unit is suitable for:

regulating an electrical power received, and supplying the electrical line to be protected according to the regulated electrical power.

Thus, the electrical power delivered may be limited, for example, according to the determined tripping threshold, enabling the electrical power delivered to be adapted to the diameter of the cable downstream of the circuit breaker.

Advantageously, the circuit breaker may include an electronic module for monitoring the operation of the processing unit. This module is notably implemented so as to trip the circuit breaker when the latter is detected to be out of service.

It should be noted that "trip" is understood to mean the action of changing the circuit breaker from the engaged state (circuit closed) to the tripped state (circuit open).

According to one advantageous embodiment, the processing unit may further be suitable for:

detecting operating anomalies from the diameter value or the collected data; and emitting a warning.

Thus, an operative and/or a consumer may be warned of the mismatching of the diameter of the electrical cable with the rating of the circuit breaker, or of malfunctions that have occurred in the electrical network of the apartment. Warnings may notably indicate the non-compliance of the installation by specifying the potential fault that generated the warning.

According to one possible embodiment, the cable diameter sensor is a laser device.

A second aspect of the invention relates to an electrical installation including at least one circuit breaker such as the circuit breaker provided above. Such an electrical installation may, for example, be an electrical panel of an apartment or an electrical network of an industrial building or of a public establishment (typically a hotel or a hospital).

According to a third aspect, the invention relates to a method of controlling a circuit breaker for the protection of at least one electrical line with at least one electrical cable. The method is characterized in that it comprises at least the following steps of:

collecting data from an electrical cable diameter sensor; and verifying that the value of the diameter is greater than or equal to a limit value determined from an assigned current of the circuit breaker.

At the installation phase of the circuit breaker, this method makes it possible to determine whether the diameter of the cable matches the rating of the circuit breaker.

A signal (light, sound, or a warning) may be emitted for warning the installer of the result of the verification performed.

According to one particularly advantageous embodiment, the method of control may further comprise a step of determining, according to the value of the diameter, at least a first threshold for tripping an electrical cut-out of the line to be protected.

The method thus makes it possible to automatically adapt the tripping level of the circuit breaker with respect to the cable diameter detected.

In addition, the method may further comprise the steps of:
  collecting data from a current sensor measuring a current and a potential difference on the electrical line; and
  determining a second threshold for tripping an electrical cut-out according to the collected data and the diameter value of the cable.

It is understood that the method further enables the tripping level of the circuit breaker to be automatically adapted with respect to the consumption measured downstream of the circuit breaker.

In addition, the method may include a step of determining an operating range of the circuit breaker, the operating range being between:
  the first determined threshold; and
  the second determined threshold.

An effective tripping threshold is then determined in the operating range. When an effective tripping threshold is determined, the processing unit is implemented for tripping the circuit breaker only when the supported current is greater than the effective threshold.

Advantageously, the method may further comprise the steps of:
  receiving a calibration instruction via a communication interface of the circuit breaker; and
  determining the threshold for tripping an electrical cut-out according to the calibration instruction.

According to this embodiment, the threshold or thresholds determined from the first and second thresholds and the effective threshold may be influenced by calibration instructions sent, for example, by the electrical energy supplier.

In addition, the method may further comprise the steps of:
  monitoring the value and data collected for detecting operating anomalies; and
  emitting a warning in the event of a detected anomaly.

According to the method provided, the tripping threshold of the circuit breaker may be automatically adjusted to the electrical characteristics of the line to be protected (diameter and consumption in particular). The method therefore allows the auto-calibration of the circuit breaker according to the configuration of the electrical network downstream.

According to a fourth aspect, the invention further relates to a computer program intended to be stored in a memory of the circuit breaker. This computer program is characterized in that it comprises instructions readable by a processor of the circuit breaker, the processor implementing the method of the invention when the instructions are executed by the processor.

BRIEF DESCRIPTION OF THE DRAWINGS

Other features and advantages of the invention will emerge on examination of the detailed description below, and the accompanying drawings in which.

For reasons of clarity, the dimensions of the various elements represented in these figures are not necessarily in proportion with their actual dimensions. In the figures, identical references correspond to identical elements for the various embodiments disclosed.

DETAILED DESCRIPTION

Figure 1:
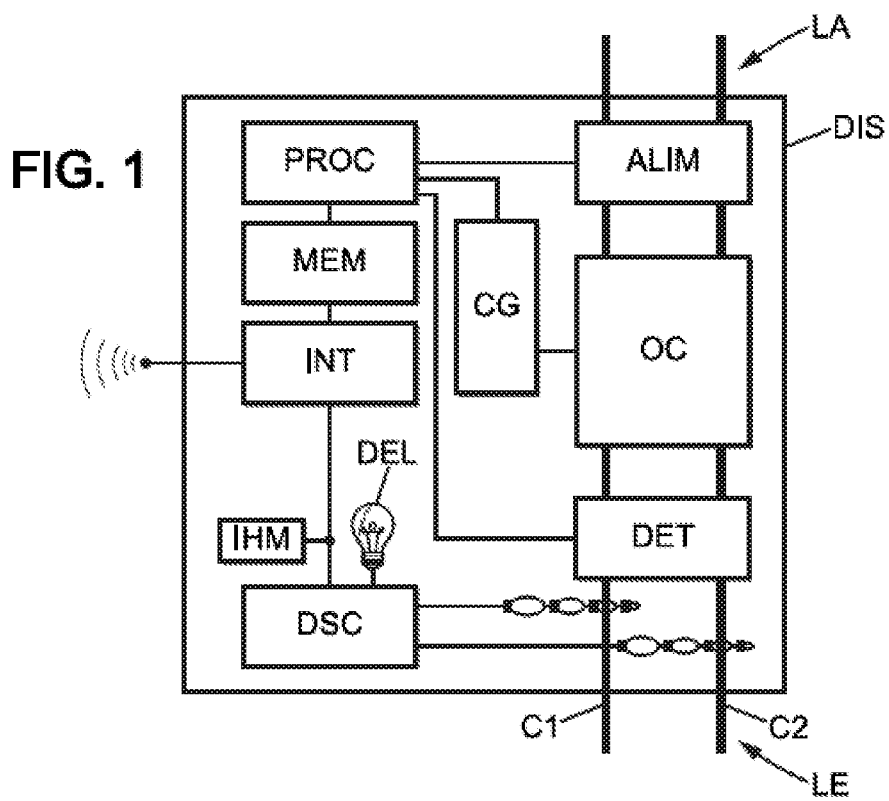
FIG. 1 represents a first example of embodiment of the circuit breaker according to the invention.

Reference is first made to FIG. 1 which illustrates one example of embodiment of the circuit breaker DIS. The circuit breaker DIS receives a main power supply via an electrical link LA upstream of the circuit breaker.

The circuit breaker DIS is intended to protect one or more electrical lines downstream. These electrical lines may be those of an apartment's electrical network, such as the electrical line LE. As a purely illustrative example, the electrical line LE comprises two electrical cables C1 and C2 (typically corresponding to one phase cable and one neutral cable).

The device DIS further comprises:
  a cut-out member OC;
  a current sensor DET;
  a diameter sensor DSC for the cables C1 and C2;
  a human-machine interface IHM;
  a light source DEL (such as a light emitting diode);
  a communication interface INT;
  a memory MEM;
  a data processing unit PROC;
  an electronic monitoring module CG; and
  an electrical power supply unit ALIM.

For protecting the electrical line LE from potential electrical malfunctions, the cut-out member OC comprises at least:
  an engaged position in which the links LE and LA are connected electrically; and
  a tripped position in which the links LE and LA are not connected electrically.

The cut-out member OC is able to remain in the engaged position as long as the supported current in the vicinity of the connection of the links LE and LA does not exceed the value of the assigned current of the circuit breaker. The assigned current d may typically be a value between 1 and 50 A (value range generally used for an apartment's electrical installation).

The member OC may notably be tripped (changing to a tripped position) when:
  the supported current is greater than the assigned current (e.g. above 10 A), which may, for example, occur during a short circuit on the line LE;
  the supported current exceeds a threshold determined by the data processing unit PROC (as explained below), typically during excess consumption on the line LE;
  a control instruction is executed by the circuit breaker (as described farther on).

The data processing unit PROC is particularly suitable for comparing the value of the diameter of the cables C1 and C2 with a limit value above which the diameters of the cables of the line LE must be for matching the rating of the circuit breaker DIS.

As a purely illustrative example, the cables C1 and C2 must be of a diameter of at least 1.8 mm (corresponding to a cable section of approximately 2.5 mm$^2$) when the rating of the circuit breaker DIS is 16 A.

For this purpose, the sensor DSC measures the diameter of the cables C1 and C2 and transmits the measured value to the unit PROC.

The unit PROC may be a processor, a microcontroller, an FPGA circuit or any other electronic circuit capable of processing data. The unit PROC is notably capable of implementing the method of controlling (described farther on with reference to FIG. 5) the circuit breaker DIS when the instructions of a computer program intended to be stored in a memory of the electrical installation (typically the memory MEM) are read and executed by the unit PROC.

The unit PROC may in particular verify whether the diameter of the cable is greater than or equal to the limit value imposed by the rating of the circuit breaker. If this is the case, the cables C1 and C2 effectively have electrical capacities sufficient for supporting an intensity up to the intensity of the assigned current of the circuit breaker.

Thus, during the installation of the circuit breaker DIS, the installer may ensure that the rating of the circuit breaker DIS is consistent with the electrical capacities of the cable or cables of the line LE and that the electrical installation in place is safe.

In the example illustrated, when the diameter of the cables C1 and C2 are identical and greater than the limit value, the installer may be notified that the cables are of a diameter:
  that is sufficient via a green light emitted by the source DEL; or
  that is insufficient via a red light emitted by the source DEL.

Other embodiments are possible for warning the installer or the consumer of the result of the verification performed by the unit PROC. Accordingly, the unit may control the interface JIM to display a message with the result of the verification (e.g. "Cable section valid" or "Cable section not valid") or to transmit this result to the consumer via the communication interface INT.

The unit PROC may refine the conditions for tripping the circuit breaker DIS by calculating the thresholds for tripping an electrical cut-out of the electrical line to be protected. The thresholds may be determined according to data relating to the configuration (cable diameter) and behavior (electrical consumption) of the line LE.

For this purpose, the unit PROC is suitable for collecting:
  the value of the diameter measured by the sensor DSC; and
  the data collected by the current sensor DET.

The sensor DET is capable of measuring the current and a potential difference on the line LE, and more particularly on the cables C1 and C2.

The determined threshold for tripping an electrical cut-out may be an intensity from which the circuit breaker DIS is tripped. For this to occur, and according to one possible embodiment, when the data collected by the unit PROC reveals that the current measured by the sensor DET exceeds the intensity of the determined threshold, the unit PROC may control the member OC to change to the tripped position.

Furthermore, the tripping threshold may further be determined by the unit PROC according to a calibration instruction received via the interface INT. As an example, a management unit of the electrical panel may send an instruction for updating the calibration of the circuit breakers. This instruction may be aimed, for example, at increasing the tripping threshold of the main circuit breaker of the panel (e.g. when the consumer orders a higher power level from the energy supplier).

The tripping threshold may thus be controlled according to instructions received via the interface INT. Such an embodiment may also enable:
  the energy supplier to restrict the rating of the circuit breakers when consumers are defaulting on paying their bills;
  users to regulate their consumption.

It should be noted however that the tripping thresholds may be determined according to current values that are less than or equal to a corresponding maximum value relative:
  to the assigned current of the circuit breaker; or
  to a maximum value imposed by the section of the cable.

Indeed, for preserving the electrical safety of the installation as a priority, the tripping threshold is of a lower intensity than that which can support the electrical capacities of the line to be protected and of the circuit breaker.

The memory MEM is suitable for archiving data collected from each of the sensors. The diameter values, the current and potential difference data measured are stored permanently in the memory MEM, which is non-volatile (flash memory card or other type). The data may further be duplicated cyclically, by transmitting data via the interface INT, to a remote database (as described below with reference to FIG. 4).

The memory MEM may further archive the values of the determined tripping thresholds together with a look-up table comprising one or more limit values associated with different diameters of standard cables.

The limit values may, for example, be predetermined according to a limit current that can support a cable having a given diameter, without any risk of electrical malfunction thereof. The memory may further store assigned current data relating to the circuit breaker (specifying the latter's rating value).

When the data of the sensors DET and DSC is stored in the memory MEM, the archived data may be identified and timestamped, for example, for setting up fault and/or consumption monitoring services.

The communication interface INT is used to send and receive data such as measurement data or instructions for managing/regulating the circuit breaker DIS. The unit PROC is suitable for transmitting the value of said diameter or the data collected by the sensor or sensors DET and/or DSC. Consequently, on reception of a request for data via the interface INT, the requested data may be transmitted to the requesting entity, typically a management unit of a smart electrical panel. The communication interface INT may be:
  an Ethernet interface;
  a radio interface;
  a Wi-Fi interface; or
  any other interface allowing the consumer or an operative to consult the collected and archived information and/or allowing a transfer of this information to a remote processing unit, e.g. an electrical panel management unit, a remote server or an electronic strongbox.

The communication interface makes it possible to emit a warning to the consumer when the unit PROC detects an operating anomaly from the collected data (typically an unusual value with respect to the values stored in the memory MEM).

The circuit breaker DIS may further warn of the anomaly via a sound or light signal emitted by the circuit breaker, or a warning message displayed on the interface IHM.

The emitted warnings may, for example, be related to the detection of:
- a plurality of cables detected with different diameters during the diameter measurement phase by the sensor DSC;
- tripping of the member OC of the circuit breaker;
- non-operation of equipment having a cyclical consumption (typically a freezer, refrigerator, water heater, etc.);
- mismatching of the circuit breaker's rating with respect to the electrical uses connected to the line to be protected; or
- mismatching of the circuit breaker's rating with respect to the dimensioning of the cables of the line to be protected.

Warnings may be timestamped from a reference clock module (atomic clock) comprised by the circuit breaker for synchronizing the exchanges between the circuit breaker and a remote management station, for example. Timestamped warnings may further be archived in the memory MEM.

The consumption data measured by the sensor DET and the warnings sent by the circuit breaker DIS enable users to monitor, manage and optimize the energy consumption of the dwelling and to be warned of possible faults.

Furthermore, the interface INT makes it possible to receive control instructions from the circuit breaker DIS for the cut-out member OC to be placed in the engaged or tripped position. When the consumer receives a warning of a malfunction and the circuit breaker has then been tripped, the consumer is then able, for example, to order the re-engagement of the circuit breaker via a control instruction. According to another example, the consumer may send a control instruction (typically from an application provided for this purpose on their Smartphone) to the circuit breaker for it to be put in the tripped position while the consumer is absent from the apartment.

The power supply unit ALIM is connected to the line LA upstream of the cut-out member OC so as to remain supplied with electricity even when the member OC is in the tripped position. The unit ALIM supplies power to the various electronic components of the circuit breaker DIS such as the unit PROC, the memory MEM and the interface INT, and this regardless of the position of the member OC.

In the event of a tripping of the circuit breaker DIS, the equipment connected downstream, via the line LE, is no longer supplied with power, but the unit PROC of the circuit breaker remains supplied with power for handling the fault and emits a warning.

Furthermore, the electrical power supply unit ALIM may be designed to behave as an electrical power supply regulator controlled by the unit PROC so as to:
- regulate an electrical power received downstream of the circuit breaker via the line LA, and
- supply power to the electrical line LE downstream according to the regulated electrical power.

In this way, the electrical power received may be adapted on the electrical line LE according to the diameter of the cables C1 and C2 so that the regulated power matches the electrical capacities of the line LE downstream of the circuit breaker.

The electronic module CG for monitoring the operation of the processing unit may regularly interrogate the unit PROC according to a predetermined cycle (e.g. every minute). If during one or more cycles the unit PROC does not respond to the interrogations of the module CG, the module CG is able to control the component OC to trip the circuit breaker DIS. This safety measure is used to cut the electrical power supply on the line LE downstream of the circuit breaker in order to guard against any malfunction when the unit PROC is no longer operating.

The consumer may also act manually on the cut-out member OC locally or may act remotely (by sending a control instruction).

The diameter sensor DSC for the electrical cables C1 and C2 is, for example, a laser device which is in the form of a succession of juxtaposed openings of different sizes, with which laser beams are respectively associated passing through each of the openings (forming a laser barrier, for example).

These laser devices can detect the presence of cables inserted in at least one of the openings. The openings correspond to predefined cable gauges. When the installer installs the cable in the gage most appropriate to the cables C1 and C2, the measured cable diameter corresponds to the gauge of the opening for which the sensor DSC detects a cable presence. The measured diameter corresponds to a value of section of the cable for determining the electrical capacities thereof.

As an example, the sensor DSC comprises four openings of diameters 1.4; 1.8; 2.8 and 3.6 mm which correspond respectively to sections of approximately 1.5, 2.5, 6, and 10 $mm^2$. Typically, for a circuit breaker with an assigned current of 16 A, the limit value may be a cable section of 2.5 $mm^2$, substantially corresponding to a diameter of 1.8 mm.

Figure 2:
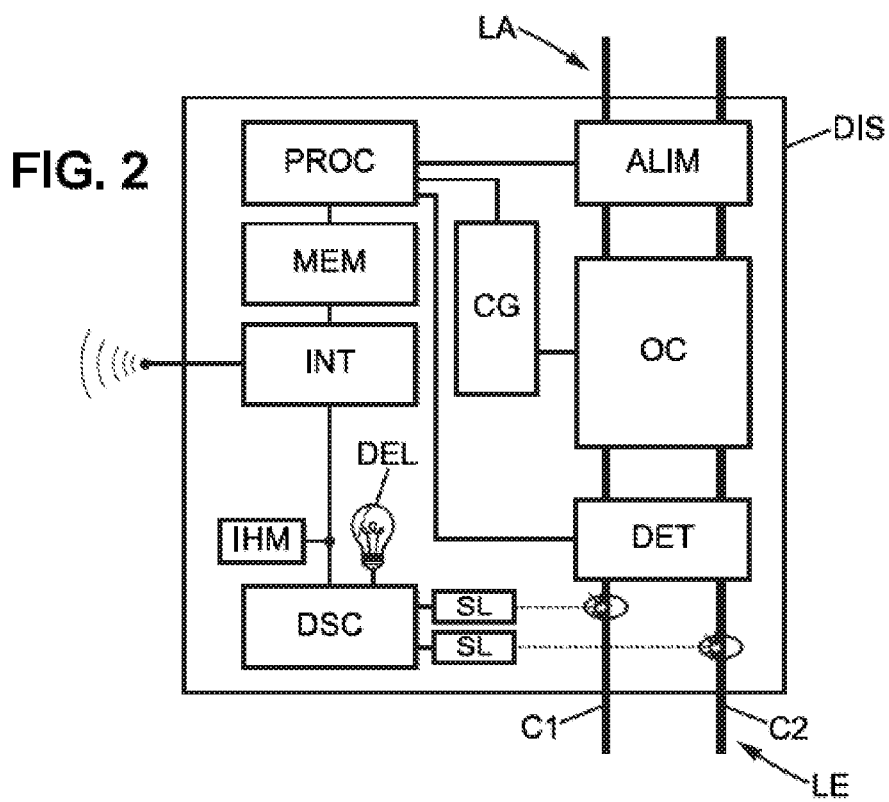
FIG. 2 represents a second example of embodiment of the circuit breaker.

Reference is now made to FIG. 2 in which another example of embodiment of the circuit breaker is represented, and in particular, another embodiment of laser device for measuring the diameter of the cables C1 and C2.

Here, the sensor DSC measures the diameter via a laser pulse emitted by one or more laser sources SL. The laser sources are able to pick up the return of the laser pulse and determine from the time gap between the laser pulse emitted and its return, the size of the cables inserted in the circuit breaker DIS. This embodiment makes it possible to precisely and directly measure the diameter of the cables C1 and C2.

Figure 3:
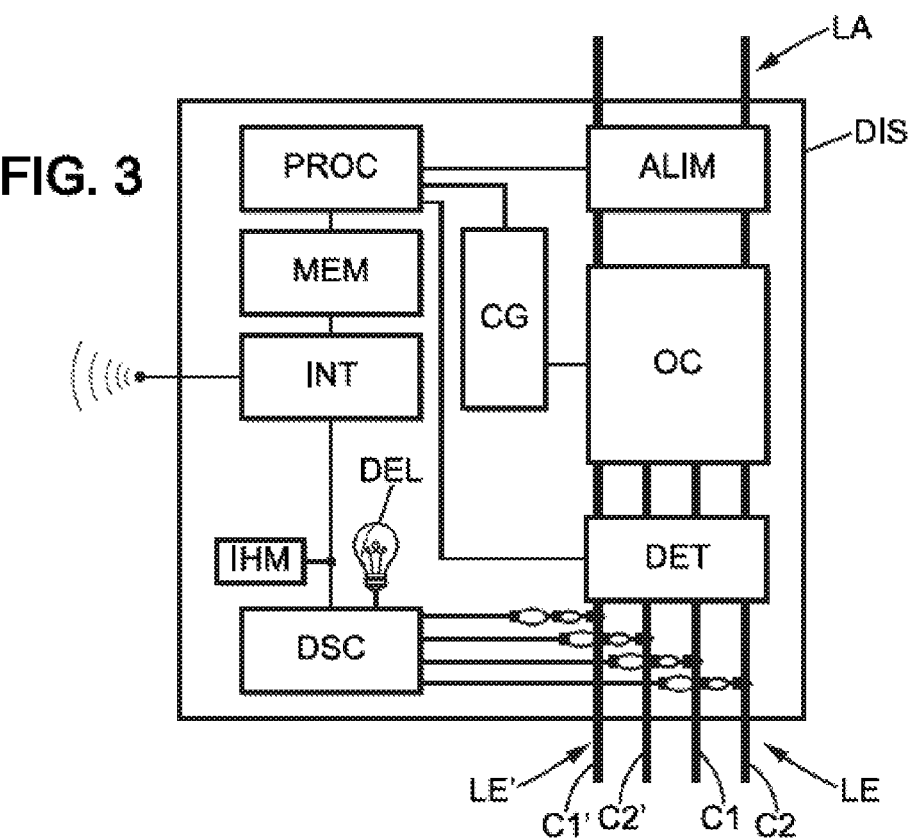
FIG. 3 represents a third example of embodiment of the circuit breaker.

In FIG. 3, another example of embodiment is illustrated in which the circuit breaker DIS protects two electrical lines LE and LE', each including two electrical cables (one cable for the phase, one neutral cable). In this embodiment, the diameters of each of the cables are measured and compared.

Indeed, for the electrical installation to be correct, the cables of the same electrical line LE, LE' should be of substantially the same diameter. For the line LE, the unit PROC retrieves the diameter value of the cables C1 and C2. For the line LE', the unit PROC retrieves the diameter value of each of the cables C1' and C2'. The unit compares the diameter of C1 with C2 and of C1' with C2'. If the diameters do not match between C1 and C2, and/or between C1' and C2', the circuit breaker DIS emits a warning for notifying the anomaly.

Figure 4:
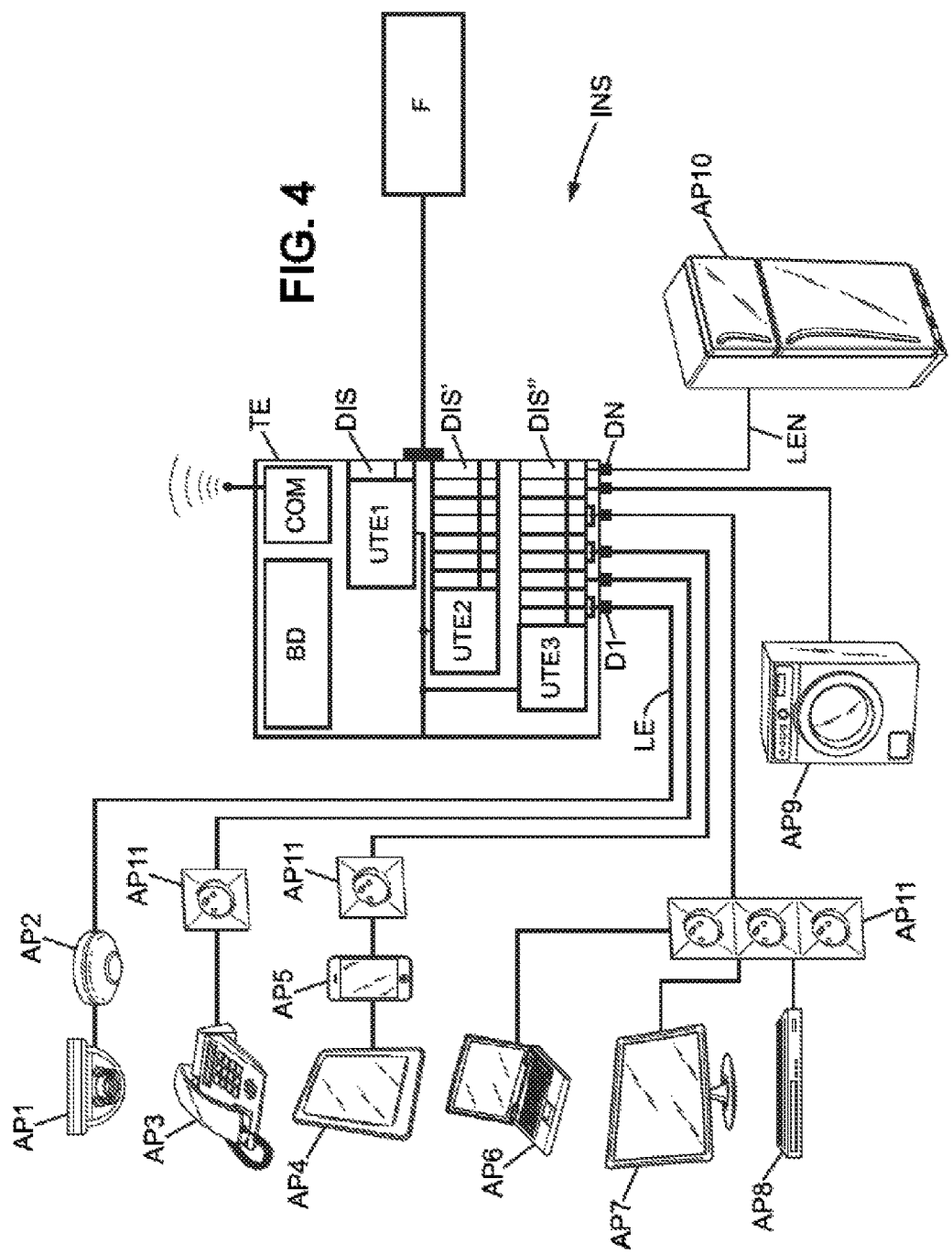
FIG. 4 illustrates an example of electrical installation including multiple circuit breakers according to the invention.

Reference is now made to FIG. 4 in which an example of electrical installation INS is illustrated including an electrical panel TE.

The panel TE may comprise outgoing cables D1 to DN which are respectively connected to one or more electrical lines LE1 to LEN to supply electricity. In order to protect these electrical lines, one or more of the above-mentioned circuit breakers DIS or rows of such circuit breakers DIS', DIS", are arranged within the panel TE.

These circuit breakers are, upstream of the outgoing cables D1 to DN, associated with the lines LE1 to LEN. The circuit breakers may receive a main electrical supply via electrical lines upstream (not represented in this figure), providing, for example, electrical energy from a supplier F.

The lines LE1 to LEN may notably be suitable for electrically supplying appliances that are connected thereto, as, for example, the appliances AP1 to AP11 which may be:
- multimedia equipment (e.g. AP1 to AP8);
- electrical equipment such as power sockets or power strips (AP11);
- household equipment such as a refrigerator, washing machine, or freezer (typically AP9 and AP10);
- or other type.

For reasons of clarity in the figure, only the outgoing cables D1 to DN of the bottom row of circuit breakers DIS" have been represented. It should be noted, however, that outgoing cables may be provided for each of the circuit breakers or for groups of circuit breakers on the panel TE.

The panel TE further comprises at least one management unit, such as the management units UTE1, UTE2 and UTE3. These units UTE1, UTE2, UTE3 may exchange data with the units PROC of the circuit breakers DIS, DIS' and DIS", notably via their interface INT. In this way, the circuit breakers DIS on the panel TE may receive control instructions from the units UTE1, UTE2, UTE3.

For this purpose, the circuit breaker may have an identification number (e.g. an IP address) allowing the units UTE1, UTE2, UTE3 to identify the origin and/or destination of the data exchanged with the circuit breakers.

The data collected by the electronic circuit breakers and archived in their memory MEM may be communicated (e.g. cyclically) to the management units on the panel TE which collect and permanently archive the data from all the electronic circuit breakers on the panel. Accordingly, the panel TE comprises a database BD. The database BD may be any medium capable of recording digital data in a sustainable manner. As an example, such a means of storage may be an SSD disk with flash memory.

The units UTE1, UTE2, UTE3 may be capable of ordering the data to be stored and securing the stored data via means of authentication and/or encrypted encoding.

According to one possible embodiment, the data collected and archived in the database BD may be duplicated automatically in a secure electronic strongbox with a frequency determined according to a parameterization of the consumer.

The current measurements of each circuit breaker on the electrical panel enable detailed consumption information to be collected. This information allows consumers' awareness to be raised, enables them to manage and optimize their energy consumption in the apartment and to have access to a detailed report on the electrical consumption inherent to the connected appliances.

Consumers may, moreover, be warned of any fault detected such as an unsuitable cable diameter or a circuit breaker tripping.

When an appliance is disconnected from the line LE, provision may be made to send a warning message to the unit PROC or to the units UTE1, UTE2, UTE3 so as to order the circuit breaker DIS to limit the value of the tripping threshold or to trip the member OC.

The panel may further comprise a communication module COM intended to communicate the data collected by the management units UTE1, UTE2 and UTE3 and/or archived in the database BD of the panel TE. The units UTE1, UTE2, UTE3 may accordingly format and communicate the data transmitted by the circuit breakers.

Via the communication module COM, the units UTE1, UTE2, UTE3 may further relay warnings received from the circuit breakers to a remote computer system and/or to the consumer.

Figure 5:
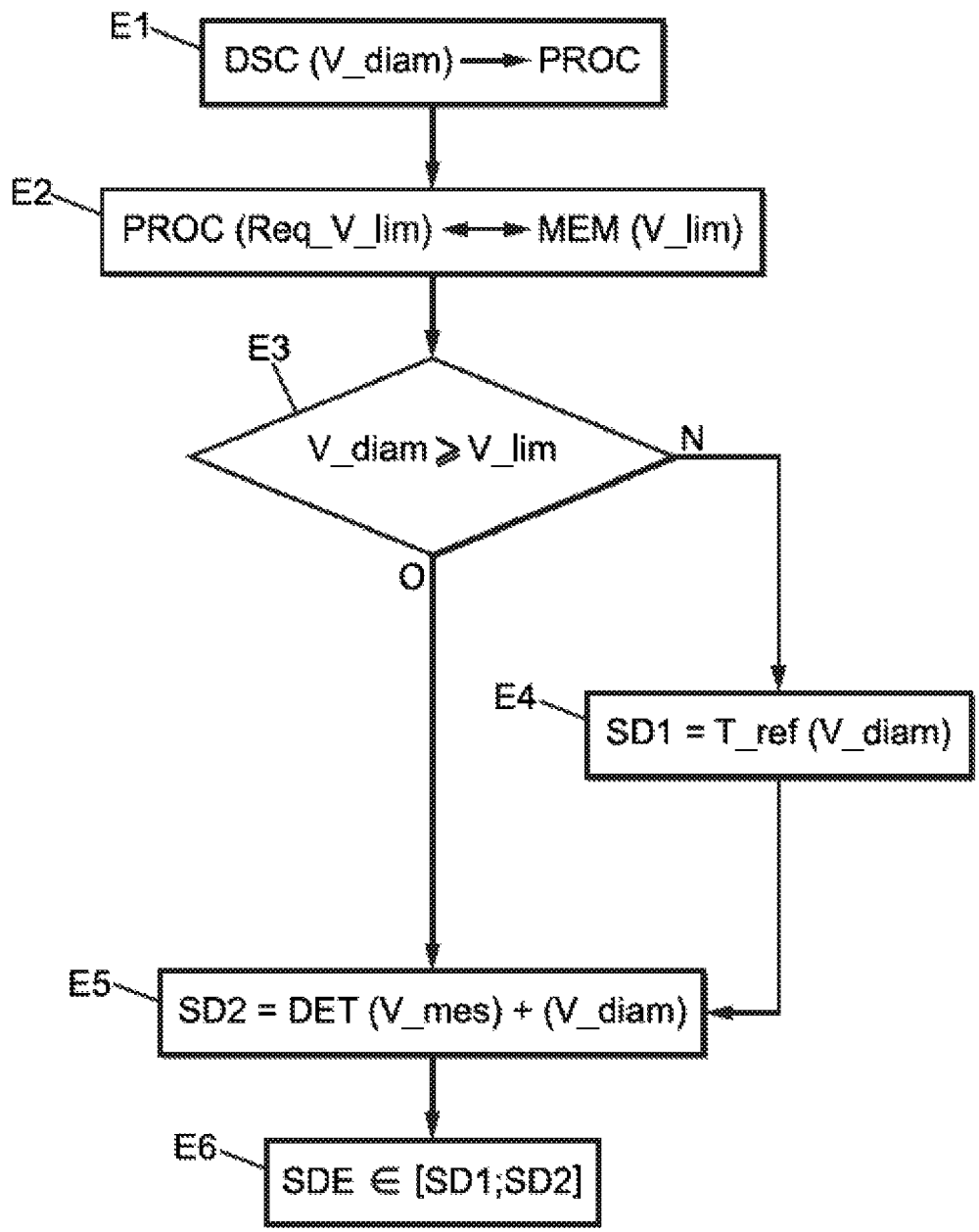
FIG. 5 is a flowchart representing an example of a succession of steps in the method of controlling the circuit breaker according to the invention.

Reference is now made to FIG. 5 in which a flow diagram represents an example of a succession of steps in the method of controlling the circuit breaker provided.

According to a step E1, the unit PROC of the circuit breaker receives a value of the diameter V_diam of a cable of the line LE, measured by the diameter sensor DSC.

In a step E2, the unit PROC consults a limit value V_lim previously archived in the memory MEM of the circuit breaker (e.g. via a request Req_V_lim addressed to the memory MEM). The value V_lim may be a value of minimum diameter required by the rating of the circuit breaker. This value V_lim may be defined when the circuit breaker is manufactured according to the assigned current which may be supported or may be updated by the unit PROC.

According to a step E3, the unit PROC verifies that the value of the diameter V_diam is greater than or equal to the limit value V_lim determined from the assigned current (i.e. rating) of the circuit breaker.

Following the arrow N at the exit from the verification of step E3, the value V_diam is not greater than V_lim, in which case the triggering threshold should be limited according to the diameter of the cable, so that the circuit breaker is calibrated according to the effective electrical capacities of the cables.

For this purpose, according to a step E4, the unit PROC determines, according to the value V_diam, a first threshold SD1 for tripping an electrical cut-out. The unit PROC may consult, for example, a look-up table T_ref stored in the memory MEM, which table T_ref includes tripping threshold levels according to different diameter standard values.

Following the arrow O at the exit from the verification of step E3 (V_lim greater than or equal to V_diam) or at the conclusion of step E4, the unit PROC collects data V_mes from the current sensor DET during a step E5. The data V_mes is data relating notably to a current and a potential difference measured on the line LE. The unit PROC may then determine a second threshold SD2 for tripping an electrical cut-out according to the collected data V_mes and the diameter value of the cable V_diam.

According to an optional step E6, the unit PROC may further determine an operating range of the circuit breaker. This operating range may be between the first threshold SD1 and the second threshold SD2. An effective triggering threshold SDE is then determined by the unit PROC in the determined range. The circuit breaker is hence parameterized for being tripped only (without taking account of the thresholds SD1 and SD2) according to the effective threshold SDE.

In this way, the tripping thresholds SD1, SD2, and SDE can be used to adjust the electrical protection provided by the circuit breaker according to the electrical characteristics of the line to be protected. It is thus possible to maintain the electrical performance of the circuit breaker, the installation and the associated equipment by the auto-adaptation of the circuit breaker's rating in an appropriate range according to the section of the cable downstream.

The method may further include other optional steps not illustrated in the figure such as:
- the reception of a calibration instruction via the interface INT;
- the determination of the threshold SD1 or SD2 according to the calibration instruction;
- monitoring the diameter value V_diam and the collected data V_mes for detecting operating anomalies; and
- emitting a warning in the event of a detected anomaly.

Various phases of verification may be implemented by an installer so as to obtain a safe installation of the circuit breaker.

For example, during an initiation phase, no cable is inserted in the circuit breaker. The diameter value of the cable is initialized to zero and the cut-out member is placed in a tripped position (circuit open).

Then, during the cable insertion phase, the installer may use the interface IHM of the circuit breaker to proceed to a diameter measurement of the inserted cable (e.g. pressing a button to initiate the measurements). The cable is then detected and measured by the sensor DSC, which sensor transmits the diameter value to the unit PROC for verifying the latter. The diameter value measured may further be archived in the memory MEM. According to the diameter, the circuit breaker's rating may be automatically calibrated (notably according to the above-mentioned steps E4 and/or E5).

Once the insertion phase is completed and the circuit breaker is correctly calibrated according to the cable, the cut-out member may be placed in complete safety in the engaged position (circuit closed) and hence, effectively protect the electrical line.

According to another possible embodiment the sensor DSC is installed away from the electrical line LE. The installer may then first measure the size of the cable via the sensor DSC, secondly auto-calibrate the circuit breaker according to this size, then insert the cable by screwing it in a location of the circuit breaker intended to receive a cable to be protected.

The installer may further configure the circuit breaker before the installation at a consumer's premises, e.g. by parameterizing the measurement channels according to the circuit breaker's rating (1 A; 10 A; 16 A; etc.) and the equipment connected (oven, power socket, light, etc.).

Consequently, taking into account the foregoing, it is clear that the circuit breaker provided and the corresponding method of controlling such a circuit breaker, can be used to customize the electrical safety of an installation according to the component equipment thereof and the section of the cables.

Indeed, the circuit breaker notably solves various safety problems such as:
 the mismatching of the section of the cables connected downstream of the circuit breaker with its rating;
 an unsuitable tripping threshold with respect to the electrical uses of the protected line (usually causing a tripping latency of the circuit breaker);
 incorrect association of the cable with the circuit breaker; and
 incorrect calibration with respect to the consumer's contract.

The circuit breaker thus significantly improves the safety of property and persons, being further able to serve as a platform for the implementation of services in the apartment.

The invention has been described with reference to particular embodiments which are not restrictive. Of course, the present invention is not restricted to the embodiment described as an example and it extends to other variants. Notably, the number and the nature of the sensors may vary according to the applications, as well as the modes of transmission and consultation of the collected data.

The invention claimed is:

1. A circuit breaker for the protection of at least one power line comprising at least one electrical cable, the circuit breaker comprising at least:
 an electrical cable diameter sensor; and
 a data processing unit connected to the diameter sensor for receiving a value of said diameter,
 said processing unit being capable of verifying that the value of said diameter is greater than or equal to a limit value determined from an assigned current of said circuit breaker.

2. The circuit breaker as claimed in claim 1, wherein said processing unit is further capable of determining, according to the value of said diameter, a first threshold for tripping an electrical cut-out of the line to be protected.

3. The circuit breaker as claimed in claim 2, further comprising a current sensor suitable for measuring a current and a potential difference on said electrical line, the processing unit being further capable of collecting data from said current sensor and determining a second threshold for tripping an electrical cut-out according to said collected data and the diameter value of the cable.

4. The circuit breaker as claimed in claim 3, further comprising at least one memory suitable for archiving data collected from each of said sensors.

5. The circuit breaker as claimed in claim 1, further comprising at least one communication interface, the processing unit being suitable for transmitting, on request, via the communication interface, the value of said diameter or said data collected by the sensor or sensors.

6. The circuit breaker as claimed in claim 5, wherein said processing unit is capable of determining said at least one threshold for tripping an electrical cut-out of the line to be protected according to a calibration instruction received via the communication interface.

7. The circuit breaker as claimed in claim 5, wherein the circuit breaker is engaged or tripped on receiving a control instruction received via said communication interface.

8. The circuit breaker as claimed in claim 1, further comprising an electrical power supply unit controlled by the processing unit, said electrical power supply unit being suitable for:
 regulating an electrical power received, and
 supplying said electrical line to be protected according to the regulated electrical power.

9. The circuit breaker as claimed in claim 1, wherein, when said processing unit is out of service, an electronic module for monitoring the operation of said processing unit trips the circuit breaker.

10. The circuit breaker as claimed in claim 1, wherein the processing unit is further suitable for:
 detecting operating anomalies from the diameter value or the collected data; and
 emitting a warning.

11. The circuit breaker as claimed in claim 1, wherein the cable diameter sensor is a laser device.

12. An electrical installation including at least one circuit breaker as claimed in claim 1.

13. A method of controlling a circuit breaker for the protection of at least one electrical line comprising at least one electrical cable, the method comprising at least the steps of:
 collecting data from an electrical cable diameter sensor;
 verifying that the value of said diameter is greater than or equal to a limit value determined from an assigned current of said circuit breaker; and
 based on the verifying step, tripping an electrical cut-out of the at least one electrical line.

14. The control method as claimed in claim 13, further comprising a step of determining, according to the value of said diameter, a first threshold for tripping an electrical cut-out of said line to be protected.

15. The control method as claimed in claim 14, further comprising the steps of:
   receiving a calibration instruction via a communication interface of the circuit breaker; and
   determining said threshold for tripping an electrical cut-out according to said calibration instruction.

16. The control method as claimed in claim 13, further comprising the steps of:
   collecting data from a current sensor measuring a current and a potential difference on said electrical line; and
   determining a second threshold for tripping an electrical cut-out according to said collected data and the diameter value of the cable.

17. The control method as claimed in claim 13, further comprising a step of determining an operating range of the circuit breaker, said operating range being included between:
   said first threshold; and
   said second threshold;
   an effective tripping threshold being determined in said operating range.

18. The control method as claimed in claim 13, further comprising the steps of:
   monitoring the diameter value and data collected for detecting operating anomalies; and
   emitting a warning in the event of a detected anomaly.

19. A non-transitory computer program product stored in a memory of a circuit breaker, comprising instructions readable by a processor of said circuit breaker, said processor implementing the method according to claim 13 when said instructions are executed by said processor.

* * * * *